United States Patent [19]

Kennedy et al.

[11] Patent Number: 4,863,276

[45] Date of Patent: Sep. 5, 1989

[54] MIXING DEVICE AND METHOD FOR ITS MANUFACTURE

[75] Inventors: Richard B. Kennedy; Jeffrey C. Widen, both of South Norwalk, Conn.

[73] Assignee: Total Foam, South Norwalk, Conn.

[21] Appl. No.: 177,371

[22] Filed: Apr. 1, 1988

Related U.S. Application Data

[63] Continuation-in-part of Ser. No. 862,658, May 13, 1986.

[51] Int. Cl.$^{4}$ .......................... B01F 7/00; B01F 15/04; C08J 9/00

[52] U.S. Cl. .................................... 366/130; 366/162; 366/172; 366/249; 366/325; 422/133; 422/135

[58] Field of Search ............... 366/249, 250, 251, 252, 366/253, 254, 247, 248, 160, 167, 168, 173, 172, 129, 130, 150, 309, 312, 313, 325, 326, 162; 422/133, 135, 225; 222/135, 129, 145, 255, 526; 239/114, 115, 116, 432, 403, 398, 600

[56] References Cited

U.S. PATENT DOCUMENTS

| | | | |
|---|---|---|---|
| 3,102,004 | 8/1963 | Grintz | 422/133 |
| 3,193,202 | 7/1965 | Liggenstorfer et al. | 222/129 X |
| 3,236,419 | 2/1966 | De Remer et al. | 222/135 |
| 3,377,139 | 4/1968 | MacGregor et al. | 422/133 |
| 3,559,848 | 2/1971 | Standlick | 222/135 |
| 3,741,441 | 6/1973 | Eberle | 222/135 |
| 3,892,389 | 7/1975 | Contastin | 366/173 X |
| 4,404,168 | 9/1983 | Baumberger | 422/133 X |

*Primary Examiner*—Harvey C. Hornsby
*Assistant Examiner*—Scott J. Haugland
*Attorney, Agent, or Firm*—Eric P. Schellin

[57] ABSTRACT

An improved mixing device for mixing at least two of a plurality of pressurized liquids, the device consisting of hollow tubular member defined as having a longitudinal axis, one or two open ends and an interior wall member, one of the open ends having at least two cut-out portions generally symmetrically disposed about the axis, a segmental slot member generally radially disposed in the hollow tubular member between each of the cut-out portions for receiving a supporting projection in locking engagement therewith, and an envelope mounted on and extending about each of the cut-out portions for receiving and encompassing a conduit member terminating at and within each of the cut-out portions, each envelope being disposed, constructed and arranged for directing one of the plurality of pressurized liquids onto a proximate area of the interior wall means thereof. The wall is cleaned by turning off the fluid flow but the blades continue to be rotationally driven whereby the wall is wiped clean by the blades which push the residue out the tubular members.

5 Claims, 4 Drawing Sheets

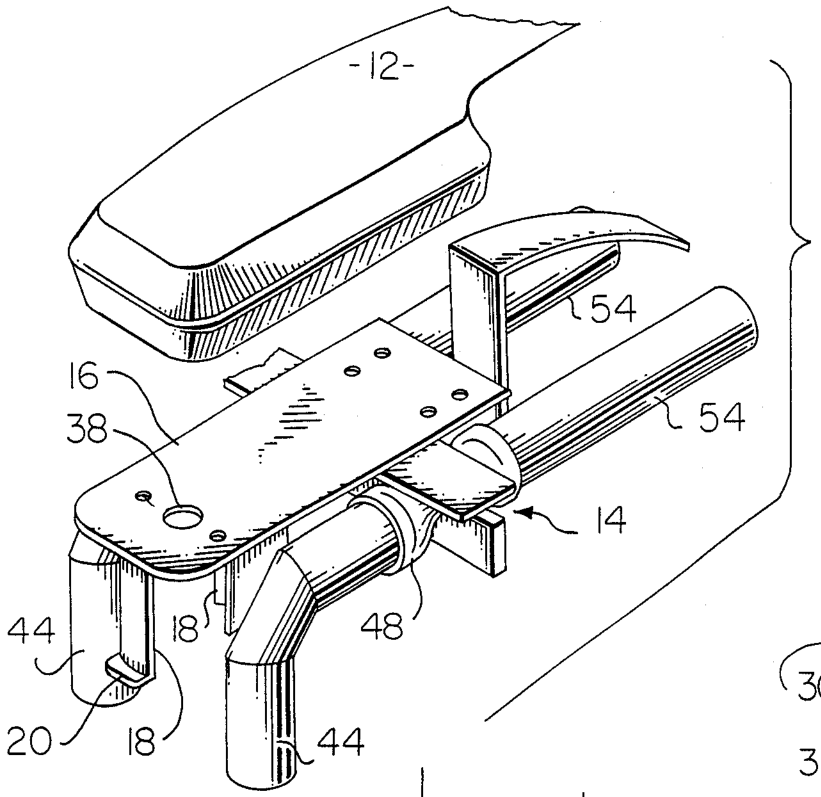
Fig. 3
Fig. 5
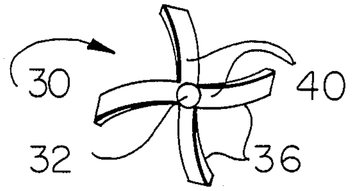
Fig. 6
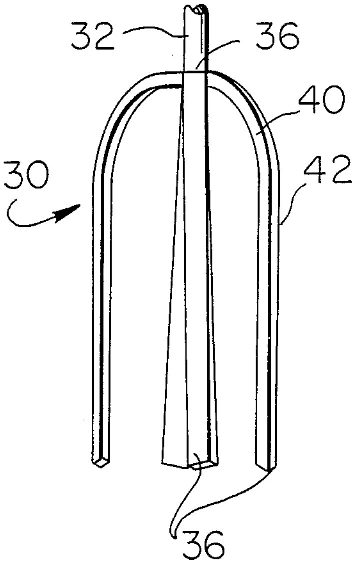
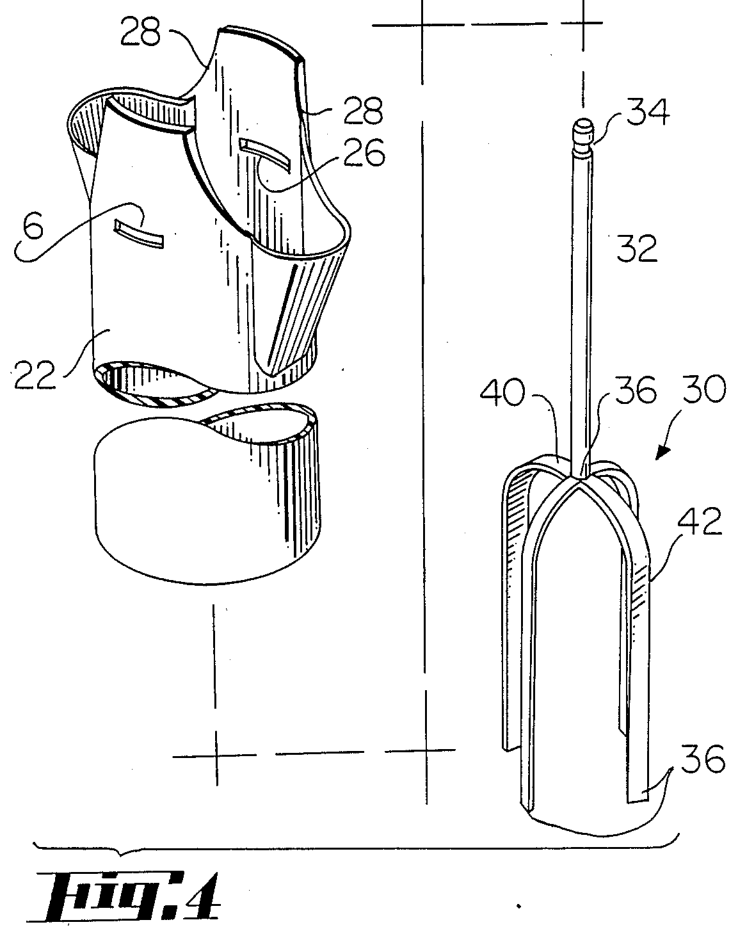
Fig. 4

Fig. 7
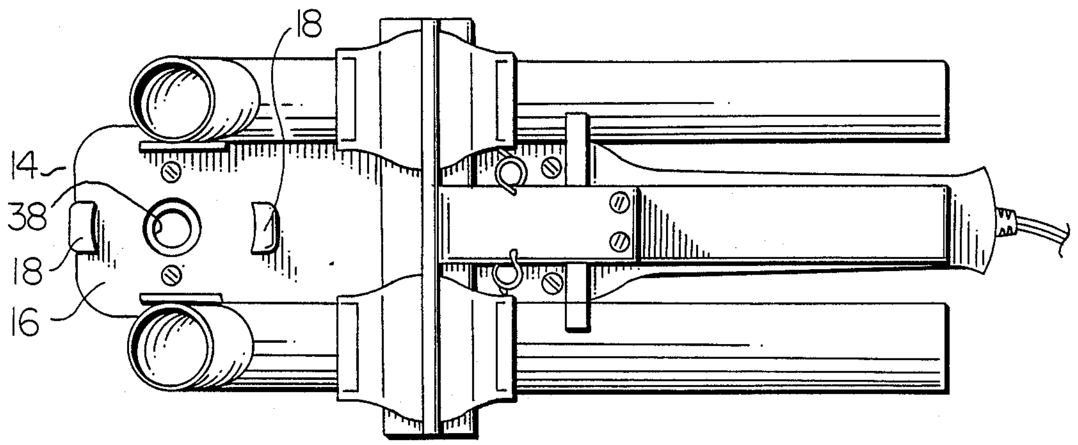
Fig. 8
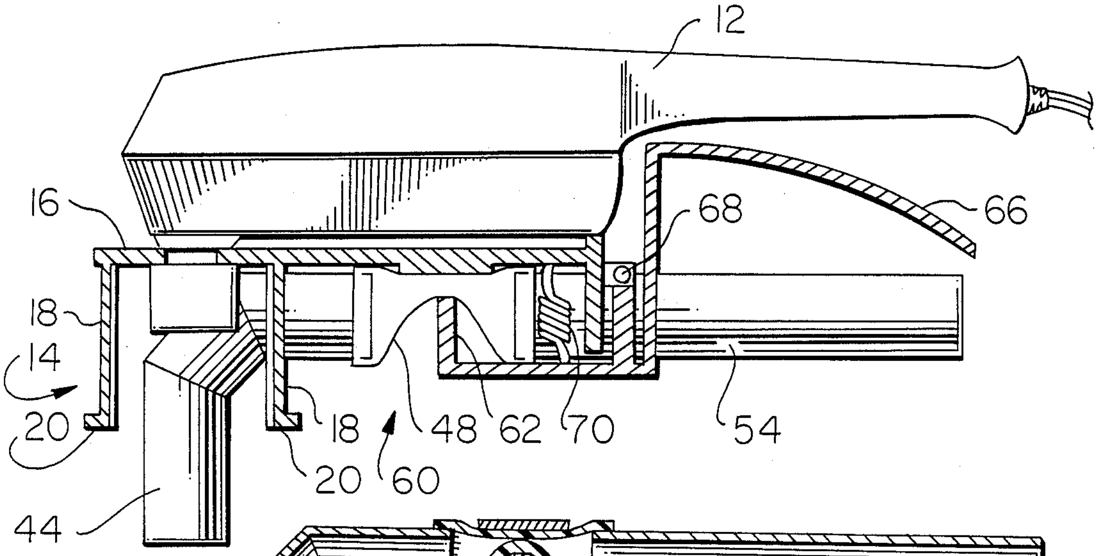
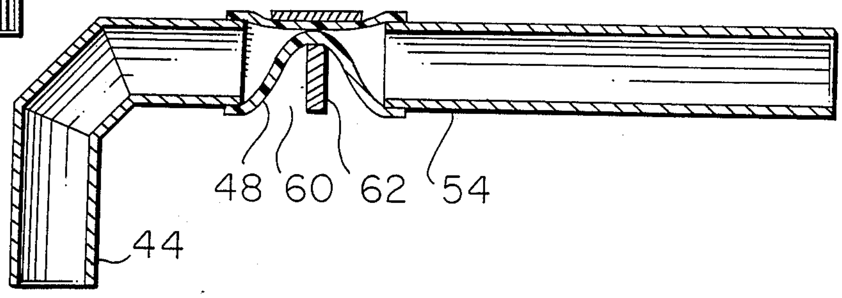
Fig. 9
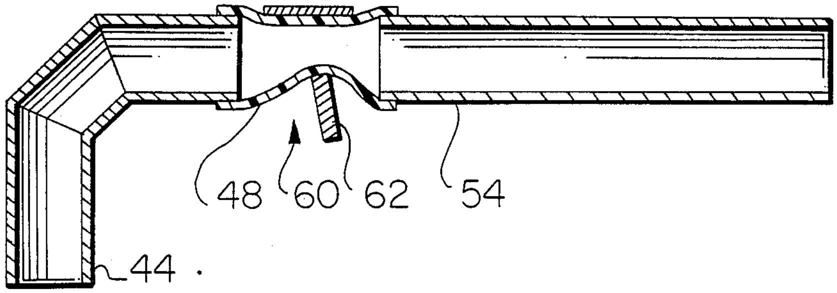
Fig. 10

MIXING DEVICE AND METHOD FOR ITS MANUFACTURE

BACKGROUND OF THE INVENTION FIELD OF THE INVENTION

This application is a continuation-in-part application of co-pending patent application Ser. No. 862,658, filed May 13, 1986 and entitled Mixing Device. As stated in the above referenced application the entire disclosure of U.S. Pat. No. 4,521,544 is incorporated herein by reference.

The invention relates to an improved mixing device and its method for mixing at least two of a plurality of pressurized liquids consisting of a hollow tubular member defined as having at least a longitudinal axis, two open ends and an interior wall member, one of the open ends having at least two cut-out portions generally symmetrically disposed about the axis, a segmental slot member generally radially disposed in the hollow tubular means between each of the cut-out portions for receiving a supporting projection in locking engagement therewith, and an envelope mounted on and extending about each of the cut-out portions for receiving and encompassing a conduit member terminating at and within each of the cut-out portions, each envelope being disposed, constructed and arranged for directing one of the plurality of pressurized liquids onto a proximate area of the interior wall member thereof.

The invention relates further to an improved method of making mixtures of a plurality of pressurized liquids consisting at least of the steps of directing at least two of a plurality of pressurized liquids generally onto an interior wall of a hollow tubular member, rotatably driving a plurality of blade means defined as having distal, free ends and a trailing edge thereof and mounted on rotating shaft means within the hollow tubular means, the blade means throughout a portion toward the distal, free ends progressively extending radially outward from the rotating shaft and radially inward from the trailing edge of the blade means thereof and wiping the liquids upon the inner wall by action of the blade means interfacing the liquids upon the inner wall for urging the liquids on the interior wall into miscible relation, as more particularly described herein.

DESCRIPTION OF THE PRIOR ART

Various prior art mixing devices, and the like, as well as apparatus and method of their construction in general, are found to be known, and exemplary of the U.S. prior art are the following:

4,521,544 Richard B. Kennedy and the cited patent references therein.

The U.S. Pat. No. 4,521,544 discloses the manufacture of cellulosic compositions from cellulosic products, such as wet cellulosic products that can be formed into foamed, or rigid non-foamed, compositions, where these cellulosic products or other components thereof were pressurized liquids, the compositions being prepared by mixing the products in a mixing tank of suitable capacity with an electric mixer, and after adequate processing of the mixing stage, the mix is poured into a slab mold or walled cavity.

The patent, or known prior uses disclosed in it, are seen to teach and disclose various types of mixing devices of sorts and of various manufactures and the like as well as methods of their construction, but none of them whether taken singly or in combination disclose the specific details of the combination of the invention in such a way as to bear upon the claims of the present invention.

SUMMARY OF THE INVENTION

An object, advantage and feature of the invention is to provide an improved mixing device for accomplishing a mixing step of a plurality of liquids directed into a hollow tubular member by rotating uniquely constructed blade members having trailing edges contacting the inner wall of the hollow tubular member and by the portion of the blade members distal of the free ends diverging away from the inner wall for urging the liquids into wiping relation with the blade members and the inner wall.

Another object the invention is directed further to of an improved mixing device and a method for mixing at least two of a plurality of pressurized liquids consisting of a hollow tubular member defined as having at least a longitudinal axis, two open ends and an interior wall member, one of the open ends having at least two cut-out portions generally symmetrically disposed about the axis, a segmental slot member generally symmetrically disposed about the axis in one embodiment, a segmental slot member generally radially disposed in the hollow tubular means between each of the cut-out portions for receiving a supporting projection in locking engagement therewith, and an envelope mounted on and extending about each of the cut-out portions for receiving and encompassing a conduit member terminating at and within each of the cut-out portions, each envelope being disposed, constructed and arranged for directing one of the plurality of pressurized liquids onto a proximate area of the interior wall member thereof.

Also an object of the invention is to provide a simple and direct method for an improved method of making mixtures of a plurality of pressurized liquids consisting at least of the steps of directing a least two of a plurality of pressurized liquids generally onto an interior wall member of a allow tubular member, rotatably driving a plurality of blade means defined as having distal, free ends and a trailing edge thereof and mounted on rotating shaft means within the hollow tubular means, the blade means throughout a portion toward the distal, free ends progressively extending radially outward from the rotating shaft and radially inward from the trailing edge of the blade means for urging the pressurized liquids on the interior wall means into miscible relation, and the product of the method of mixing a plurality of pressurized liquids thereof as more particularly described herein.

These together with other objects and advantages which will become subsequently apparent reside in the details of the process and operation thereof as more fully hereinafter is described and claimed, reference being had to the accompanying drawings forming a part hereof, wherein like numerals refer to like parts throughout.

DESCRIPTION OF THE SEVERAL VIEWS OF THE DRAWINGS

FIG. 3 is an exploded perspective view of a motor housing and a supporting base assembly of the mixing device.

FIG. 4 is an exploded perspective view of the hollow tubular member and blade member thereof.

FIG. 5 is a top or plan view of the blade member.

FIG. 6 is a side or elevation view of the blade member.

FIG. 7 is a bottom view of the mixer device base assembly.

FIG. 8 is a partial sectional view of the mixer device of FIG. 7.

FIG. 9 is a sectional view of a pressurized liquid feed line shown in its open position.

FIG. 10 is a sectional view of the line of FIG. 9 shown in its closed position.

DESCRIPTION OF A PREFERRED EMBODIMENT OF THE INVENTION

Figure 1:
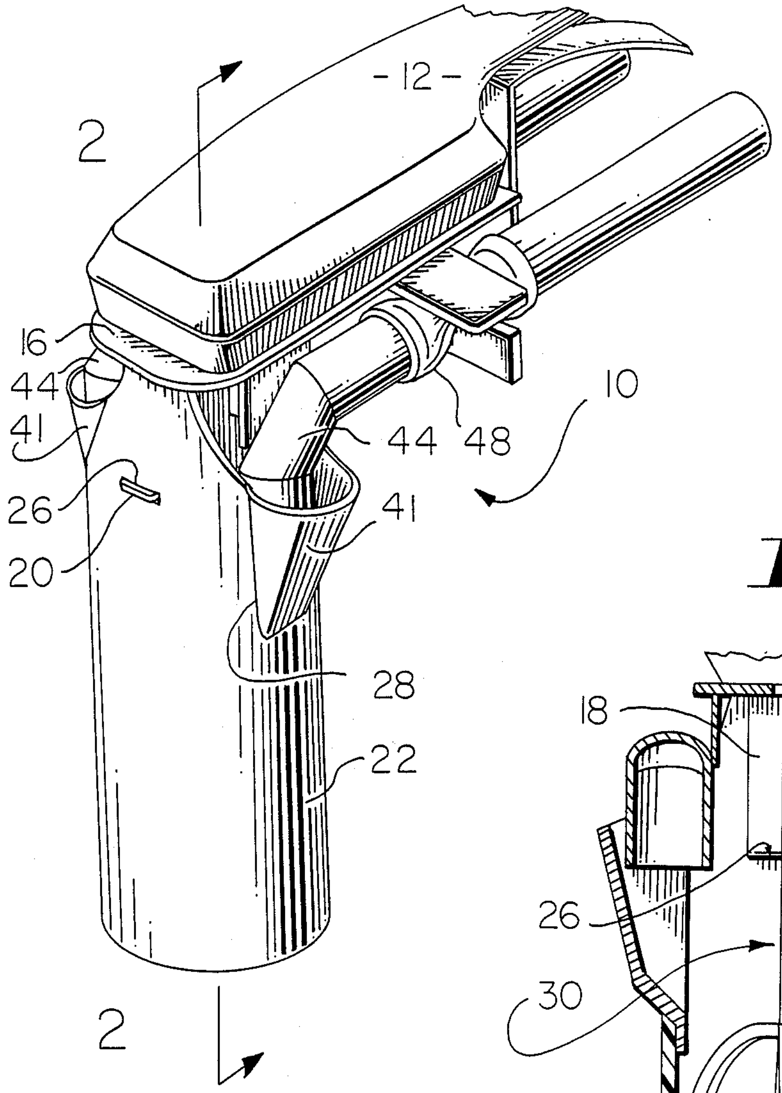
FIG. 1 is a front perspective view of an improved mixing device and illustrating a typical installation of the mixing device according to a preferred embodiment and best mode of the present invention.
Figure 2:
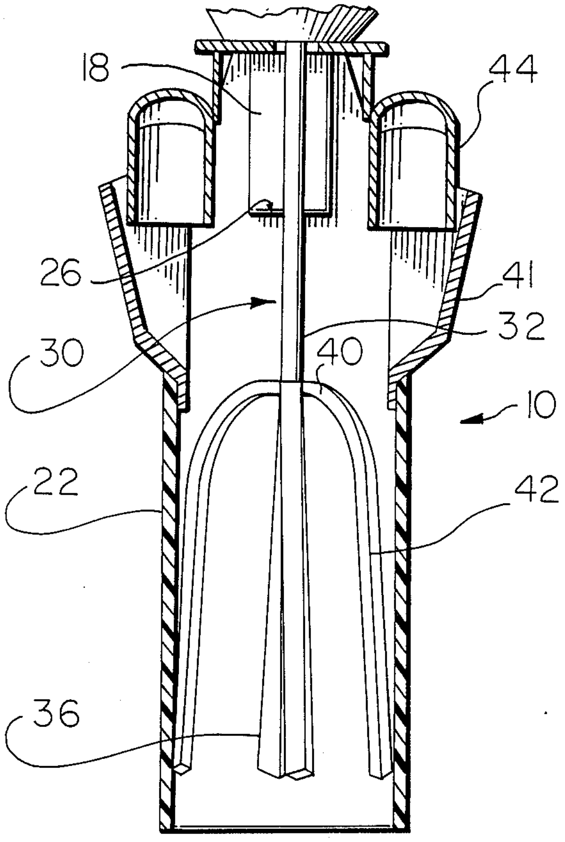
FIG. 2 is a sectional view thereof taken along lines 2—2 of FIG. 1 and embodying the concepts of the invention.

Referring now to the drawings there is shown in the FIGS. 1–10 an improved mixing device 10 according to a preferred embodiment and best mode of the present invention, having a motor housing 12 for encapsulating a motor (not shown), a supporting base assembly 14 including a base 16 capable of securable attachment with the motor housing 12, at least two supporting extensions 18, 18 directed downwardly beneath the base 16, and terminating in supporting extensions 20 for contacting and retaining in place a hollow tubular member 22. The hollow tubular member with its inner wall, has open ends. The hollow tubular member 22 has a segmental slot 26 in radial relation to the hollow tubular member 22 for receiving the respective supporting extensions 18, 18 between cut-out portions 28 thereof. The cut-out portions 28 are symmetrically disposed about an axis of the hollow tubular member 22 and receive the supporting extensions 18, 18 in locking engaging relation therewith.

Within the hollow tubular member 22 is a blade member 30 including a shaft 32 having at one end a groove 34 for snap engagement in conventional fashion with the motor for being driven thereby, and at the other end 36 of the shaft 32 are shown blades 36. The shaft 32 is disposed to extend through aperture 38 of the base 16 to the motor within the motor housing 12. The blades are constructed and arranged to have generally radially and angularly portions 40 extending outwardly of the shaft 32, the blades then bending into the portions 42 that progressively converge tangentially toward and upon the inner wall of the hollow tubular member 22, so the blade portion 42 forms a wedge with the inner wall for urging liquids about the area into miscible engagement. The blade portion is augmented in wedge action or effect on rotation of the blade members 30 by only the trailing portion of the blade members 30 an the leading edge thereof is contoured away or bent away from contact with the inner wall of the hollow tubular member 22.

The cut-out portions 28 are each covered with an envelope 41 mounted on and extending about each of the cut-out portions 28 for receiving and encompassing conduit 44 terminating at and within each of the envelopes 41, the envelope 41 being disposed, constructed and arranged for directing one of a plurality of pressurized liquids from source (not shown) for passing through the conduit 44 onto a proximate area of the interior wall thereof, and thence upon areas about the wedge formed by the blade portions 42 and the inner wall of the hollow tubular member 22. The envelope 41 may be constructed integrally with the hollow tubular member 22.

The conduit 44 at the end proximate the source is thence connected to a flexible tube 48 to conduit 54. Flow of pressurized liquid is readily controlled as a normally closed pressurized liquid feed line 60 shown in its closed position in FIG. 9 by a handle 66 acting through a pivot 68 being raised by an operator to its open position in FIG. 10. The closure 62 acts to compress the tube 48 from an open position of FIG. 10 to its closed position of FIG. 9 acting though the pivot 68. The closure 62 held normally closed by a spring 70.

Figure 11:
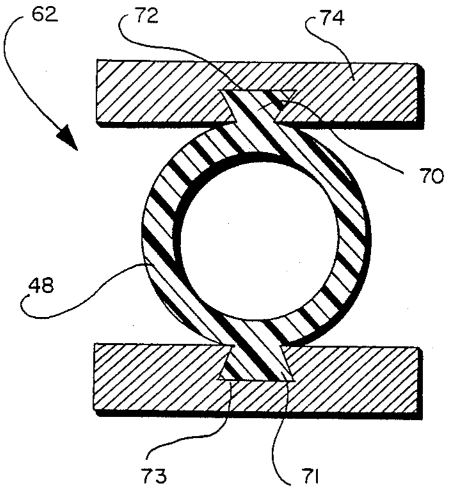
FIGS. 11 and 12 are cross-sectional views showing another embodiment for closing off the tubes in a clamping arrangement.
Figure 12:
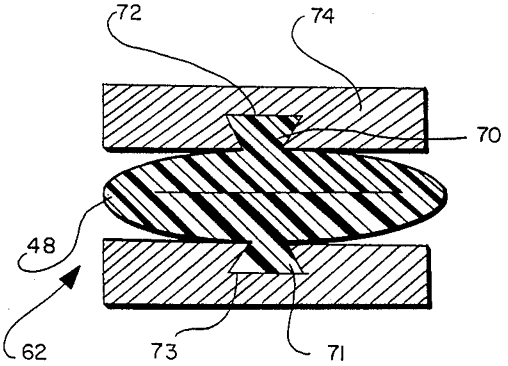

In another embodiment shown in FIGS. 11 and 12 the flexible tube 48 has a outwardly external ribs 70 and 71 on oppositely disposed sides. Each of the ribs are adapted and constructed to fit into respective receiving notches 72 and 73 disposed on the movable closure 62 and the anvil 74 of the closure 62. In this way the tube 48 is forcibly parted when the closure 62 is opened and does not have to depend on its own internal elasticity. In FIG. 11 the tube 48 is open and in FIG. 12 the tube is driven shut.

In use the device of the present invention may be used to fill any of a great number of cavities with foamed material. It has been discovered that it has particular utility in filling a polyethylene bag through a suitable opening use which bag is designed to package a to-be-protected item for subsequent transport. The bottom portion of the bag is first filled to a desired level. Then the item is placed on the foamed material. Thereafter the foamed material is further dispensed thereinto around the item and at the top thereof. The opening of the bag is then sealed and the item is well supported and protected.

The apparatus of the improved mixing device 10 of the invention may be so constructed and arranged in its component parts that it may be assembled as a kit or in kit form.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed and desired to be secured by Letters patent is:

1. An improved portable hand held mixer device for mixing at least two pressurized liquids distributed thereto comprising: support structure, a drive means mounted on said support structure, at least two conduit means mounted on said support structure, each of said conduit means terminating in an open end, valve means positioned along each of said conduit means for biasing said conduit means in a closed position, operative means mounted on said support structure for opening said valves whereby to permit the flow of said pressurized liquids, support structure attachment means, an elongated hollow tubular means having a longitudinal axis and an inner wall, said hollow tubular means having an open proximate end and an open distal end, said hollow tubular means being adapted and constructed to be secured to said support structure by said support structure attachment means, said proximate end having at least two cut-out portions generally symmetrically disposed about the longitudinal axis, wall means mounted on and extending about each of the cut-out portions at an acute angle with respect to said longitudinal axis, said open ends of each conduit means terminating proximate each of said wall means whereby said liquids when flowing from said open ends of said conduit means are directed to flow tangentially with respect to said inner wall, stirrer means mounted axially of said hollow tubular means and adapted and constructed to be driven by said drive means, said stirrer means having a plurality of elongated relatively thin blades each having a surface and each adapted and constructed to wipe at least a portion of the said inner wall when said stirrer is driven, said blades having distal free ends, said surfaces of said blades converging with the inner wall of the hollow tubular means in the direction of their distal free ends whereby the liquids introduced into said device are mixed along the inner wall and are propelled in a direction towards the distal end of said hollow tubular means.

2. The mixer device of claim 1 wherein each of the wall means is constructed integrally with the hollow tubular means.

3. The mixer device of claim 1 wherein the conduit means includes a section of flexible hose means and said valve means is a clamp means attached to said support means adapted and constructed to be manually operated.

4. The mixer device of claim 3 wherein the flexible hose means has a first radially longitudinally extending rib on one side of said flexible hose and a second radially extending rib on another side of said flexible hose, said clamp means including a first jaw means, said first jaw means having an undercut first longitudinally slot, said clamp means including a second jaw means, said second jaw means having an undercut second longitudinal slot, said first rib affixed in said first slot and said second rib affixed in said second slot whereby when said clamp is manually moved to open said flexible hose the said sides of said flexible hose remain affixed to said first jaw and said second jaw respectively.

5. The mixer device of claim 1 wherein the elongated hollow tubular means is of uniform diameter essentially throughout whereby said liquids after mixing are discharged from said distal opening of said elongated hollow tubular means.

* * * * *